(12) United States Patent
Martin

(10) Patent No.: US 6,418,351 B1
(45) Date of Patent: Jul. 9, 2002

(54) DETERMINING THE CAPACITY COMPONENTS OF TOOLS/TOOLSETS IN A MANUFACTURING LINE

(75) Inventor: Donald P. Martin, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/280,507

(22) Filed: Mar. 30, 1999

(51) Int. Cl.[7] .............................................. G06F 19/00
(52) U.S. Cl. ...................... 700/108; 700/111; 700/174; 700/175
(58) Field of Search ................... 700/99–103, 108–111, 700/115, 116, 174, 175, 96, 107; 702/176; 705/7–9

(56) References Cited

U.S. PATENT DOCUMENTS

| | | | |
|---|---|---|---|
| 5,089,970 A | * 2/1992 | Lee et al. ..................... 700/96 |
| 5,195,041 A | 3/1993 | George et al. ............... 364/468 |
| 5,229,948 A | 7/1993 | Wei et al. .................... 364/468 |
| 5,291,394 A | 3/1994 | Chapman ...................... 364/40 |
| 5,351,195 A | 9/1994 | Sherman ...................... 364/468 |
| 5,544,350 A | 8/1996 | Hung et al. .................. 395/500 |
| 5,581,691 A | 12/1996 | Hsu et al. ............... 395/182.13 |
| 5,612,886 A | 3/1997 | Weng ..................... 364/468.07 |
| 5,826,040 A | * 10/1998 | Fargher et al. ................. 705/8 |
| 5,870,696 A | * 2/1999 | Randolph ................... 702/176 |

* cited by examiner

Primary Examiner—William Grant
Assistant Examiner—Steven R. Garland

(57) ABSTRACT

A computer system, computer program product and method for evaluating manufacturing line performance includes determining tool status, determining lot status and combining the tool status and the lot status to produce status codes. The status codes include a running code a tool down code a no operator code; and a no work-in-process code.

20 Claims, 4 Drawing Sheets

DETERMINING THE CAPACITY COMPONENTS OF TOOLS/TOOLSETS IN A MANUFACTURING LINE

BACKGROUND OF THE INVENTION

1. Field of the Invention

The present invention generally relates to a method and apparatus for improving manufacturing line performance and more specifically to a method that includes both the status of the tool and the status of the lot when calculating manufacturing line performance.

2. Description of the Related Art

The major thrust of manufacturing line performance improvements in, for example, the semiconductor fabrication industry, has primarily focused on using overall equipment effectiveness (OEE) to measure and manage tool productivity. These conventional efforts use many tool state data collection systems, some of which use manually input data and others which use signals automatically input from the tool itself.

There is a relationship between cycle time and tool the utilization which is evaluated by comparing the normalized cycle time (X-factor) and the idle-no-WIP (work in progress) machine status. The X-factor is the cycle time divided by raw processing time. The cycle time is the time necessary for a workpiece to wait for the tool and to be processed by the tool and the raw processing time is only the time necessary for the tool to actually perform work on the workpiece. The "effective capacity" of a tool is the maximum throughput possible given the capacity detractors in the production line. The difference between the throughput and the effective capacity is the amount of idle-no-WIP. As throughput is increased toward effective capacity, thus reducing the idle-no-WIP, the cycle time, and hence x-factor, must necessarily increase as additional workpieces are placed before the tool. The cost of lower cycle times is the larger amounts of idle-no-WIP times.

One of the capacity detractors for a production line occurs when operators are not available to load or unload tools precisely when required. This lack of availibility can be due to other tasks which they are required to perform or can be due to such activities such as lunch or break. Therefore, the unavailability of an operator further increases capacity loss which increases the cycle time and X-factor by reducing the amount of idle-no-WIP.

Conventional measurement and tool management systems concentrate on the tool status or on lot status to determine the production line's effectiveness. Because such conventional systems are based exclusively on optimizing individual productivity classifications (e.g., tool, lot, etc.), the correlation between the operator and the tool element is difficult to measure and optimize. Further, operator activity and/or availability is conventionally measured manually, either through management observation or through operator record keeping (automated or manual). Such manual systems of monitoring operators fall victim to substantial subjective input and estimation inaccuracies.

The invention disclosed below accounts for both tool optimization and operator optimization to more precisely achieve higher production line efficiencies.

SUMMARY OF THE INVENTION

It is, therefore, an object of the present invention to provide a computer system, computer program product and a method for evaluating manufacturing line performance that includes determining tool status, determining lot status and combining the tool status and the lot status to produce status codes. The status codes include a running code, a tool down code, a no operator code, and an idle no work-in-process code.

The tool status includes one of the tool down code, the running code and a tool idle code. The lot status includes one of a waiting to be processed code and a being processed code. The no operator code is produced when the tool status is the tool idle code and the lot status is the waiting to be processed code. The idle-no-WIP code is produced when the tool status is in an idle code and there are no lots waiting to be processed. The determining of the tool status and the determining of the lot status are performed automatically by a computerized system.

Another embodiment of the invention is a system for evaluating manufacturing line performance that includes a first monitor for determining tool status, a second monitor for determining lot status and a processing unit for combining the tool status and the lot status to produce the status codes.

The processing unit produces the no operator code when the tool status is the tool idle code and the lot status is the waiting to be processed code. The processing unit also produces the idle no WIP code when the tool status is the idle tool code and there are no lots in queue to be processed. The system can include a network connecting the first monitor, the second monitor and the processing unit.

By distinguishing between different idle situations the invention is able to distinguish the magnitude of these idle situations which can, therefore, be understood and tracked which allows corrective action to be taken to reduce the impact of such idle situations. Further, the invention determines operator unavailability without monitoring the operator; as well as the amount of idle no WIP which is necessary to achieve reduced cycle time.

BRIEF DESCRIPTION OF THE DRAWINGS

The foregoing and other objects, aspects and advantages will be better understood from the following detailed description of preferred embodiments of the invention with reference to the drawings, in which.

DETAILED DESCRIPTION OF PREFERRED EMBODIMENTS OF THE INVENTION

An important component of production line capacity loss occurs when work-in-process (WIP) is available to be processed by a functioning tool, but is not processed because an operator is not available (e.g., idle-no-operator). Additionally, productivity is lost when a tool is idle because it is waiting for WIP to process (e.g., idle-no-WIP) but this is a necessary cost required to achieve reduced cycle time. Further, productivity is reduced when the tool is not functioning and WIP is waiting for the tool to be repaired, cleaned, refit, etc. (e.g., tool down). In addition, as mentioned above, the X-factor is a production efficiency rating which represents the cycle time over the raw processing time.

Figure 1:
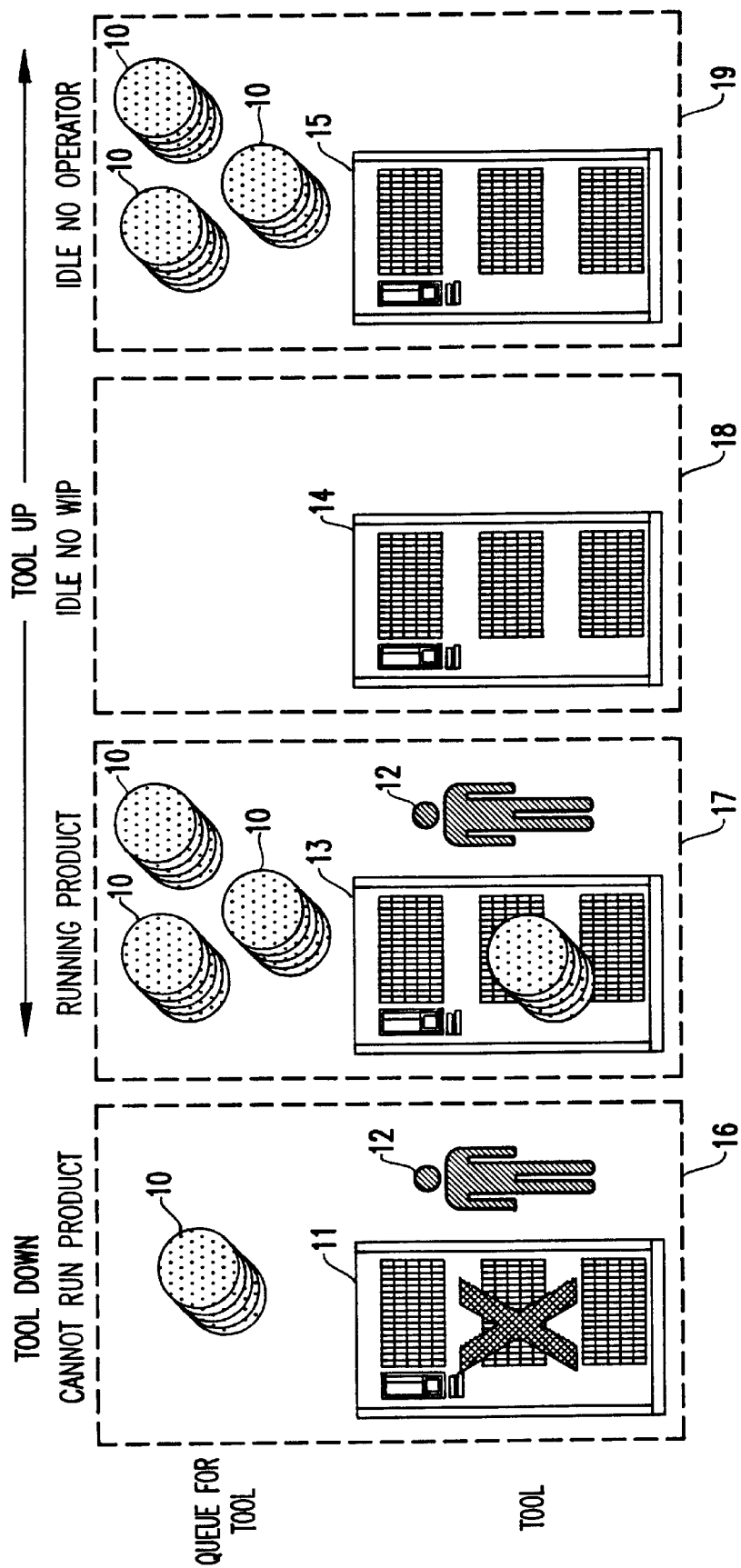
FIG. 1 is a schematic diagram showing different tool/operator/WIP states.

As shown graphically in box 16 in FIG. 1, an inefficient situation exists when a tool 11 is down and WIP 10 is waiting to be processed by an operator 12. To the contrary, box 17 illustrates a productive situation where a tool 13 is processing product 10 and being operated by an operator 12. Box 18 illustrates another apparent inefficient situation where the tool 14 is idle and no WIP is waiting (but as mention above this combination is sometimes required to reduce cycle time). Box 19 illustrates another inefficient situation where WIP 10 is waiting to be operated by a tool 15, however no operator is present so no production takes place.

Production management data collection techniques are preferably automated whenever possible. For example, the status of a tool is preferably monitored automatically using, for example, a network connection to a central processing unit which preferably monitors the activity of each tool connected to the network. Such monitoring systems are well known to those ordinarily skilled in the art. Similarly, the status of the individual production lots is also information which is preferably tracked automatically through the use of bar codes, scanners, and other similar tracking equipment, all of which are preferably connected to the same network. Alternatively, as would be known by one ordinarily skilled in the art given this disclosure, the same information can be obtained manually.

A key problem with conventional systems is that they do not differentiate between different types of idle codes. In other words, conventional systems would treat the idle condition when the tool is down 16, when the tool has no WIP to process 18 and when no operator is available 19 as the same idle situation. However, the invention differentiates between these different types of idle codes to allow the cause for the idle condition to be known more easily.

Differentiating between different idle situations is important because different types of idle codes represent different impacts on line performance. For example, when no operator is available 19, the production lost needs to be treated the same as when the tool is down 16. In both cases the effective capacity is reduced. On the other hand, some level of idle-no-WIP 18 is required in order for the line to achieve its cycle time objective.

By distinguishing between different idle situations the invention is able to distinguish the magnitude of these idle situations which can, therefore, be understood and tracked. This allows corrective action to be taken to reduce the impact of such idle situations.

Further, the invention determines operator unavailability without directly monitoring the operator. More specifically, the invention distinguishes different idle codes by combining the tool status data (e.g. tool idle down 16; tool up and running product, 17; tool idle, no WIP, 18; and tool idle, no operator 19) and the individual lot data (e.g., raw processing time and cycle time).

Due to the complex nature and the number of tests operators must perform on manufacturing lines, conventional data time entry systems and methods, such as those discussed in the Background section, will not accurately distinguish between the different types of idle situations. To the contrary, the invention overlays the tool status with the lot status to provide additional comparative information to allow the loss components to be understood, tracked and eliminated to increase performance of the production lines.

More specifically, the tool status data indicates whether the tool is down, idle or running product and the lot data indicates whether WIP is waiting to be processed in front of a tool. Therefore, with such information the various types of production losses can be determined as shown in the flowchart in FIG. 2.

Figure 2:
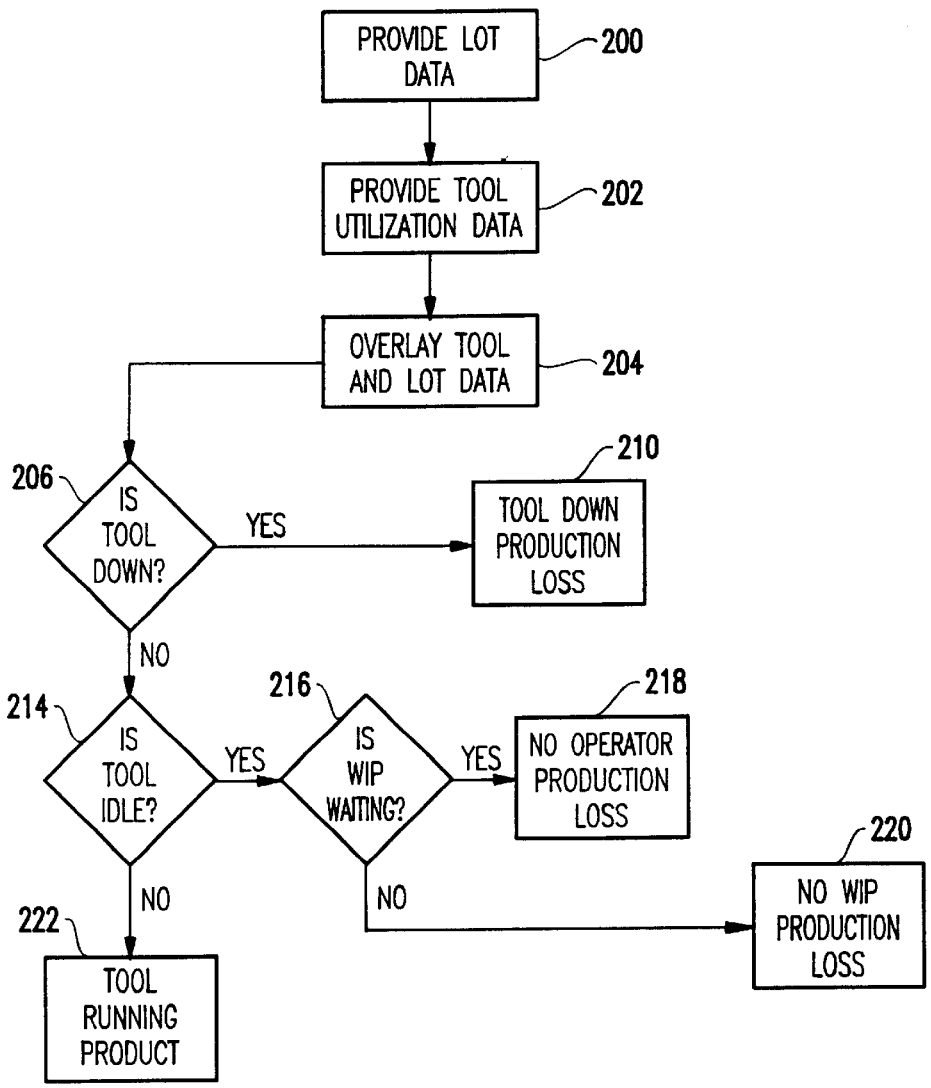
FIG. 2 is a flow diagram illustrating a preferred method of the invention.

More specifically, item 200 in FIG. 2 illustrates that the lot data is provided, preferably using an automated system, such as those discussed above. In item 202 the tool utilization data is provided, again using an automated system to provide a central unit with information regarding whether the tool is down, running product or idle. In item 204 the lot data and tool utilization data are combined.

In item 206, if the tool is down then the invention determines that production capability has been lost, as shown in item 210.

In item 214, a determination is made as to whether the tool is idle. If the tool is idle and work-in-process is waiting (item 216), the invention determines that no operator is available to process the workpiece which results in a production loss as shown in item 218. If no work-in-process is waiting, then there is no production loss and it is classified as idle-no-WIP as shown in item 220.

If item 214 determines that the tool is not idle, then the invention determines that the tool is running product and is performing a productive operation, as shown in item 222.

Figure 3:
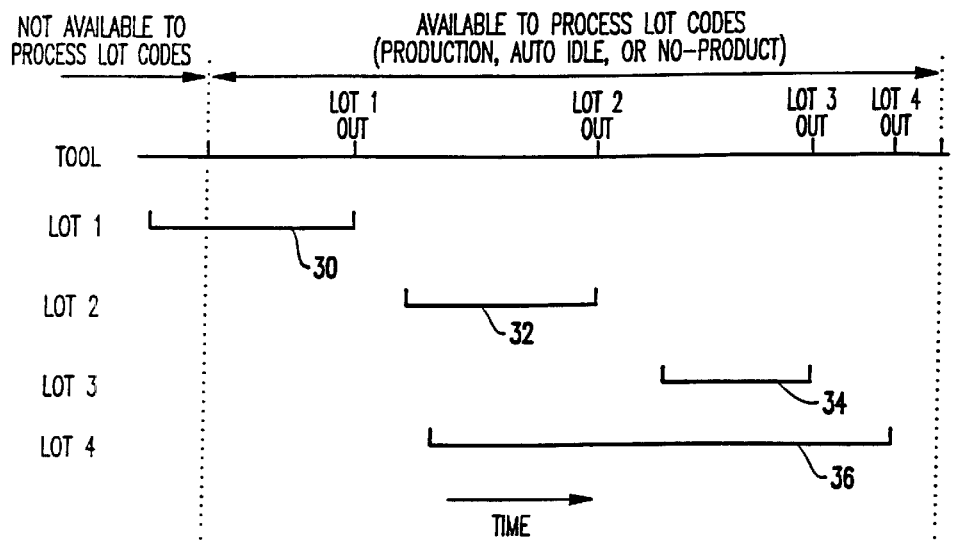
FIG. 3 is a time chart illustrating the processing time for given production lots.
Figure 4:
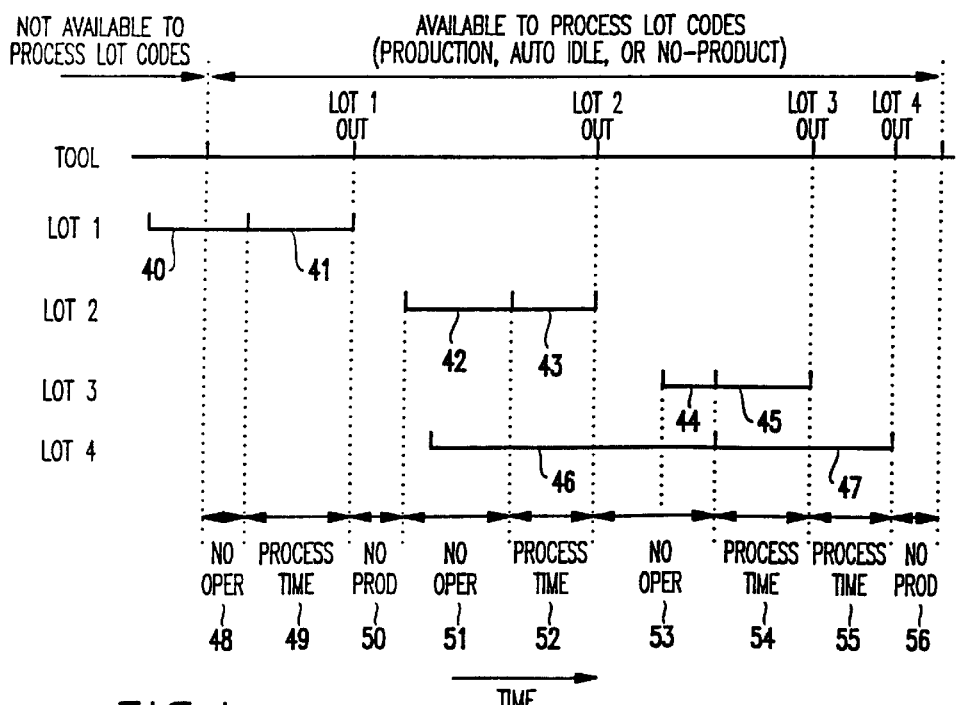
FIG. 4 is a time chart illustrating the processing time for given production lots.

FIGS. 3 and 4 illustrate the production time required to produce various lots (e.g., lots 1–4). FIG. 3 merely illustrates the cycle times (queue times and process times) 30, 32, 34 and 36 of lots 1–4, respectively. FIG. 4 illustrates the additional information which the invention provides to distinguish the different types of idle situations associated with the cycle times shown in FIG. 3.

More specifically, with respect to lot 1, the first portion of the cycle time 40 represents the queue time and section 41 of the cycle time represents the raw processing time when the workpiece was actually being processed by the tool. Similarly, with respect to lot 2, the time 42 represents the queue time and time 43 represents the raw processing time. With respect to lot 3, queue time is item 44 and time 45 represents the raw processing time. With respect to lot 4, time 46 is the queue time and time 47 is the time in tool.

By looking at the times that tools were available to process lots and comparing them to the lot state times provides the following decomposition of the available process times. Time 48 is considered to be an operator available time because the tool was up and lot 1 was in queue. Time 49 is considered to be the processing time for lot 1 (the same as time 41). Time 50 is considered to be an idle no WIP time because, during this time interval, the tool was up but there were no lots in the queue to be processed. Time 51 becomes a no operator available time because, for this time interval, the tool was up and available to run product during the entire time lot 2 waited in queue. Time 52 is the processing time for lot 2. Time 53 is also a no operator available time interval because the tool was up and lot 4 was in queue the entire time the tool was idle after finishing lot 2. Time 54 is the processing time for lot 3. Time 55 is the processing time for lot 4 as lot 3 needed to finish before lot 4 could be started. Finally, time 56 is again an idle no WIP interval because the tool was idle having finished lot 4 and there was no other WIP queued up in front of the tool. Therefore, all available processing lot times are broken into one of three categories: processing time, no operator available time, or idle no WIP time.

Therefore, as shown graphically in FIGS. 3 and 4, the additional information provided by the invention permits a substantially more exhaustive analysis of cycle time. As mentioned above, with the invention, the elements which cause unnecessary idle time (and unnecessarily add to cycle time) can be eliminated to increase production efficiency.

Figure 5:
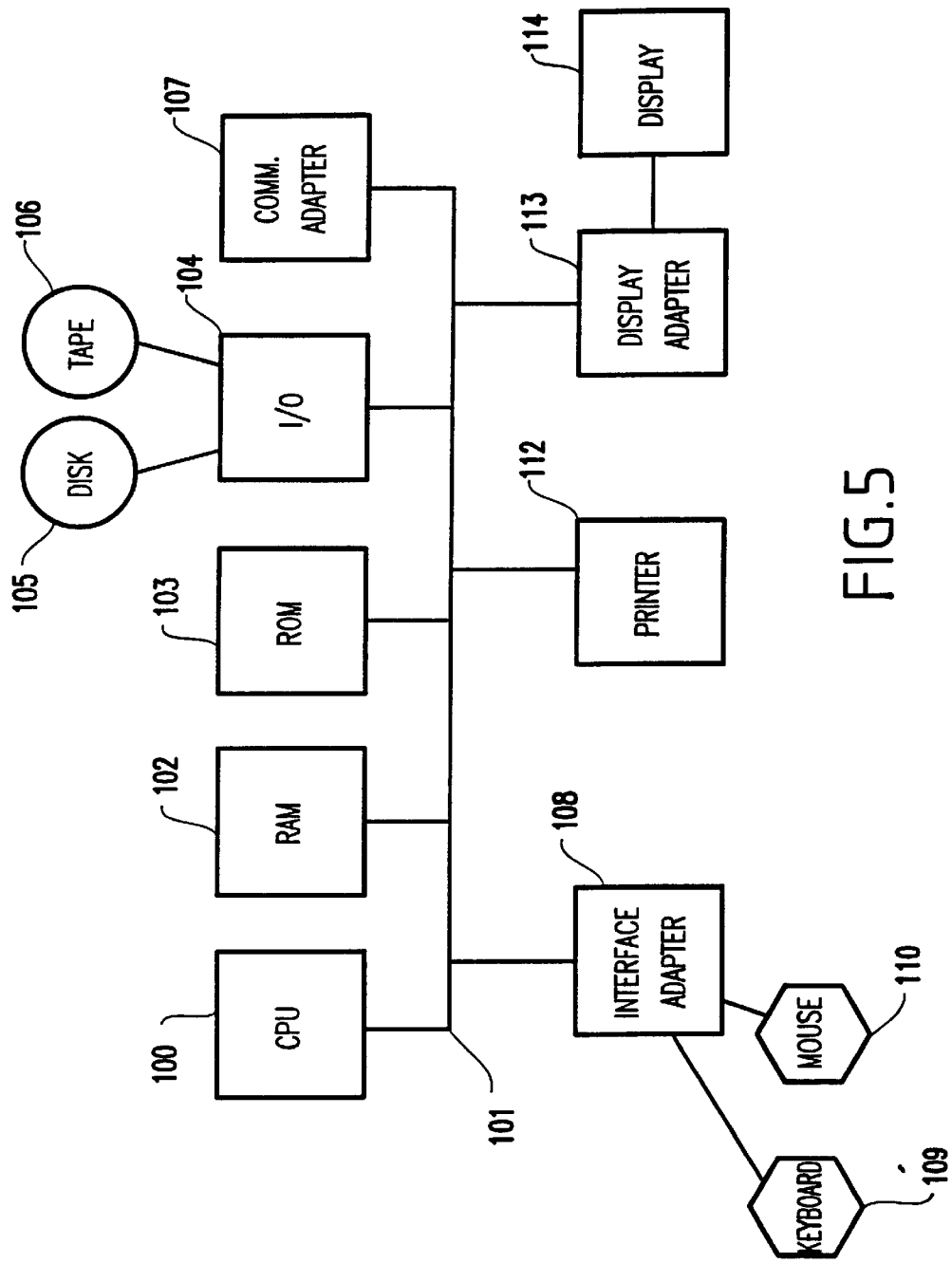
FIG. 5 is a schematic diagram of a hardware embodiment of the invention.

While the overall methodology of the invention is described above, the invention can be embodied in many number of different types of systems and executed in many number of different ways, as would be known by one ordinarily skilled in the art. For example, as illustrated in FIG. 5, a typical hardware configuration of an information handling/computer system in accordance with the invention preferably has at least one processor or central processing unit (CPU) 100. The CPU 100 is interconnected via a system bus 101 to a random access memory (RAM) 102, read-only memory (ROM) 103, input/output (I/O) adapter 104 (for connecting peripheral devices such as disk units 105 and tape drives 106 to the bus 101), communication adapter 107 (for connecting an information handling system to a data processing network) user interface adapter 108 (for connecting a peripherals 109, 110 such as a keyboard, mouse, microphone speaker and/or other user interface device to the bus 101), a printer 112, and display adapter 113 (for connecting the bus 101 to a display device 114). The invention could be implemented using the structure shown in FIG. 5 by including the inventive method within a computer program stored on the storage device 105 and providing the central processing unit 100 with lot and tool information from a network connected to the communication adaptor 107. Such a computer program would act on the lot and tool information supplied through the interface units 109, 110 or through the network connection 107. The system would then automatically produce the final desired product on the display 114, through the printer 112 or back to the network 107.

As shown above, by distinguishing between different idle situations the invention is able to separate the magnitude of these idle situations which can, therefore, be understood and tracked and allows corrective action to be taken to reduce the impact of such idle situations. Further, the invention determines operator unavailability without directly monitoring the operator.

While the invention has been described in terms of preferred embodiments, those skilled in the art will recognize that the invention can be practiced with modification within the spirit and scope of the appended claims.

What is claimed is:

1. A method for evaluating manufacturing line performance comprising:
   determining tool status by monitoring a running status of a tool;
   determining lot status by tracking a lot; and
   combining only said tool status and said lot status to produce status codes, said status codes including:
      a tool running code;
      a tool down code;
      a no operator code; and
      an idle no work-in-process code.

2. The method in claim 1, wherein said tool status includes one of said tool down code, said tool running code and a tool idle code.

3. The method in claim 2, wherein said lot status includes one of a waiting to be processed code and a being processed code.

4. The method in claim 1, wherein said determining said tool status and said determining of said lot status are performed automatically by a computerized system.

5. A method for evaluating manufacturing line performance comprising:
   determining tool status;
   determining lot status; and
   combining said tool status and said lot status to produce status codes, said status codes including:
      a tool running code;
      a tool down code;
      a no operator code; and
      an idle no work-in-process code,
         wherein said tool status includes one of said tool down code, said tool running code and a tool idle code,
         wherein said lot status includes one of a waiting to be processed code and a being processed code, and
         wherein said no operator code is produced when said tool status is said tool idle code and said lot status is said waiting to be processed code.

6. A system for evaluating manufacturing line performance comprising:
   a first monitor determining tool status by automatically monitoring a running status of a tool;
   a second monitor determining lot status by tracking a lot; and
   a processing unit combining only said tool status and said lot status to produce status codes, said status codes including:
      a tool running code
      a tool down code;
      a no operator code; and
      a no work-in-process code.

7. The system in claim 6, wherein said tool status includes one of said tool down code, said running code and a tool idle code.

8. The system in claim 7, wherein said lot status includes one of a waiting to be processed code and a being processed code.

9. The system in claim 6, further comprising a network connecting said first monitor, said second monitor and said processing unit.

10. A system for evaluating manufacturing line performance comprising:
    a first monitor determining tool status;
    a second monitor determining lot status; and
    a processing unit combining said tool status and said lot status to produce status codes, said status codes including:
       a tool running code
       a tool down code;
       a no operator code; and
       a no work-in-process code,
          wherein said tool status includes one of said tool down code, said running code and a tool idle code,
          wherein said lot status includes one of a waiting to be processed code and a being processed code, and
          wherein said processing unit produces said no operator code when said tool status is said tool idle code and said lot status is said waiting to be processed code.

11. A method of optimizing cycle and tool utilization in a manufacturing process comprising the steps of:
    determining processing times when a lot is processed on a tool through a lot database;
    providing tool utilization data from a tool utilization database; and comparing said processing times and said tool utilization data to quantify:
- a time said lot was in said tool and being processed by said tool;
- a time said lot was in said tool and not being processed by said tool;
- a time said lot was waiting to be placed in said tool; and
- a time said tool, had no lot to process; and adjusting said manufacturing process to correct for the time intervals when said tool was available.

12. The method in claim 11, wherein said tool utilization database includes a tool down code, a tool running code and a tool idle code.

13. The method in claim 12, wherein said lot database includes one of a waiting to be processed code and a being processed code.

14. The method in claim 13, wherein when said tool utilization database produces said tool idle code and said lot database produces said waiting to be processed code, said method determines that said lot was in said tool and not being processed.

15. The method in claim 11, wherein said tool utilization database and said lot database are produced automatically by a computerized system.

16. A program storage device readable by machine, tangibly embodying a program of instructions executable by the machine to perform a method for optimizing cycle and tool utilization in a manufacturing process, said method comprising the steps of:
- determining processing times when a lot is processed on a tool through a lot database;
- providing tool utilization data from a tool utilization database; and
- comparing said processing times and said tool utilization data to quantify:
  - a time said lot was in said tool and being processed by said tool;
  - a time said lot was in said tool and not being processed by said tool;
  - a time said lot was waiting to be placed in said tool; and
  - a time said tool had no lot to process; and
- adjusting said manufacturing process to correct for the time intervals when said tool was available.

17. The program storage device in claim 16, wherein said tool utilization database includes a tool down code, a tool running code and a tool idle code.

18. The program storage device in claim 17, wherein said lot database includes one of a waiting to be processed code and a being processed code.

19. The program storage device in claim 18, wherein when said tool utilization database produces said tool idle code and said lot database produces said waiting to be processed code, said method determines that said lot was in said tool and not being processed.

20. The program storage device in claim 16, wherein said tool utilization database and said lot database are produced automatically by said machine.

* * * * *